(12) United States Patent
Yokoyama et al.

(10) Patent No.: US 8,712,002 B2
(45) Date of Patent: Apr. 29, 2014

(54) NUCLEAR REACTOR BUILDING AND CONSTRUCTION METHOD THEREOF

(75) Inventors: Shigeki Yokoyama, Yokohama (JP); Makoto Ukai, Yokohama (JP); Munetaka Takahashi, Yokohama (JP); Hideo Hirai, Yokohama (JP); Takuya Miyagawa, Nakano-Ku (JP); Masashi Tanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1150 days.

(21) Appl. No.: 12/652,976

(22) Filed: Jan. 6, 2010

(65) Prior Publication Data

US 2010/0177859 A1   Jul. 15, 2010

(30) Foreign Application Priority Data

Jan. 8, 2009 (JP) ................................. 2009-002588

(51) Int. Cl.
| | | |
|---|---|---|
| *G21C 1/01* | (2006.01) | |
| *G21C 11/02* | (2006.01) | |
| *G21C 13/02* | (2006.01) | |
| *G21C 1/00* | (2006.01) | |
| *G21C 11/00* | (2006.01) | |
| *G21C 13/00* | (2006.01) | |

(52) U.S. Cl.
USPC ........... 376/294; 376/277; 376/287; 376/293; 376/295; 52/415

(58) Field of Classification Search
USPC ......... 376/277, 287, 293–296, 260, 261, 264, 376/265, 280, 282, 283, 285, 298, 299, 376/463; 422/129, 600, 630, 631, 634; 52/80.1, 169.1, 169.7, 415, 424, 425, 52/741.1, 745.02
See application file for complete search history.

(56) References Cited

U.S. PATENT DOCUMENTS

| | | | | |
|---|---|---|---|---|
| 3,438,857 A | * | 4/1969 | Sulzer ........................... | 376/283 |
| 3,459,635 A | * | 8/1969 | West et al. .................... | 376/282 |
| 3,713,968 A | * | 1/1973 | Kennedy et al. .............. | 376/293 |
| 3,889,707 A | * | 6/1975 | Fay et al. ....................... | 376/293 |
| 3,928,133 A | * | 12/1975 | Schabert et al. .............. | 376/287 |
| 3,930,943 A | * | 1/1976 | Michel et al. ................. | 376/287 |
| 4,021,297 A | * | 5/1977 | Weber ........................... | 376/293 |
| 4,080,256 A | * | 3/1978 | Braun et al. .................. | 376/293 |
| 4,123,325 A | * | 10/1978 | Ichiki et al. ................... | 376/293 |
| 4,195,064 A | * | 3/1980 | Betteken et al. .............. | 422/634 |
| 4,518,561 A | * | 5/1985 | Hista ............................. | 376/293 |
| 4,595,555 A | * | 6/1986 | Orii ............................... | 376/283 |
| 4,654,189 A | * | 3/1987 | Schoening et al. ........... | 376/265 |
| 4,752,439 A | * | 6/1988 | Elter et al. .................... | 376/299 |
| 4,777,013 A | * | 10/1988 | Wolters et al. ................ | 376/283 |
| 4,851,184 A | * | 7/1989 | Danisch et al. ............... | 376/293 |
| 4,859,402 A | * | 8/1989 | Tupper et al. ................. | 376/285 |
| 4,919,882 A | * | 4/1990 | Aul et al. ....................... | 376/293 |
| 4,949,363 A | * | 8/1990 | Tupper et al. ................. | 376/260 |

(Continued)

*Primary Examiner* — Bernarr Gregory
(74) *Attorney, Agent, or Firm* — Oblon, Spivak, McClelland, Maier & Neustadt, L.L.P.

(57) ABSTRACT

In a nuclear reactor building of a steel plate concrete structure that houses a pressure containment vessel formed with a plurality of penetration ports penetrating the pressure containment vessel on the periphery thereof and includes a biological shielding wall disposed outside the pressure containment vessel. The pressure containment vessel is vertically divided into a plurality of blocks so that each of the blocks has one or more pressure containment vessel penetration ports arranged on a same horizontal plane, and the reactor building including the biological shielding wall is divided into a plurality of modules by the horizontal plane.

3 Claims, 8 Drawing Sheets

(56) References Cited

U.S. PATENT DOCUMENTS

| | | | |
|---|---|---|---|
| 4,950,086 A * | 8/1990 | Operschall | 376/293 |
| 4,986,956 A * | 1/1991 | Garabedian | 376/283 |
| 5,037,604 A * | 8/1991 | Bauer et al. | 376/260 |
| 5,057,271 A * | 10/1991 | Turricchia | 376/280 |
| 5,190,720 A * | 3/1993 | Hunsbedt et al. | 376/287 |
| 5,201,161 A * | 4/1993 | Kamei | 52/745.02 |
| 5,215,708 A * | 6/1993 | Fennern et al. | 376/293 |
| 5,223,210 A * | 6/1993 | Hunsbedt et al. | 376/293 |
| 5,659,591 A * | 8/1997 | Gelbe et al. | 376/298 |
| 5,748,690 A * | 5/1998 | Matsuura et al. | 376/260 |
| 6,745,533 B2 * | 6/2004 | Yamashita et al. | 52/425 |
| 6,795,518 B1 * | 9/2004 | Conway et al. | 376/293 |
| 2003/0024176 A1 * | 2/2003 | Kanechika et al. | 52/169.7 |

* cited by examiner

NUCLEAR REACTOR BUILDING AND CONSTRUCTION METHOD THEREOF

BACKGROUND OF THE INVENTION

1. Field of the Invention

The present invention relates to a nuclear reactor building that houses a pressure containment vessel (PCV) of a nuclear power plant and a construction method thereof.

2. Description of the Related Art

A conventional nuclear reactor building (or merely reactor building, called hereinafter) of a nuclear power plant has been constructed by a frame made of reinforced concrete in order to meet earthquake resistant design criteria and achieve radiation shielding. The reinforced concrete building is constructed by first arranging a grid of reinforcing bars in a formwork and then pouring concrete into the formwork. After completion of the construction of the building, a pressure containment vessel and other equipment are installed in the building. These works are carried out mainly at the site of the construction of the plant, so that on-site construction work takes long time, and it may sometimes take four or more years to construct the whole of a nuclear power plant.

Recently, it is strongly demanded to reduce time and cost for constructing a building of a nuclear power plant, and in order to reduce the construction period, it is contemplated to eliminate the reinforcing bar arranging work and the concrete casting work by adopting a steel plate reinforced concrete structure composed of a combination of a steel plate and concrete (referred to as an SC structure hereinafter) or a steel structure composed mainly of steel members to construct the building, rather than the conventional reinforced concrete structure.

However, reducing only the period of construction of the frame of the reactor building is not enough to reduce the total period of construction of the entire nuclear power plant, and it is also required to reduce the period of installation of various equipments into the building. In view of such circumstances, recently, there has been provided a construction method that reduces the construction period by applying the SC structure to the frame of the reactor building, in which a composite module composed of an SC steel plate structure serving as the formwork of the frame and piping and other equipment installed or mounted on the structure is previously manufactured, and then the composite module is placed at the site of installation (see Patent Document 1: Japanese Patent Laid-Open No. 2003-167086, for example).

In addition, requirements on the security of the nuclear power plant have become severe in recent years, and there is a demand for including provision not only for design basis accidents but also for unexpected events, such as severe accidents, in the design criteria of plant facilities of nuclear power plants. For example, if a loss of coolant accident (LOCA), which is a design basis accident, occurs, and reactor cooling fails, hydrogen may be generated in the PCV, increasing the pressure in the PCV beyond the design value.

In such a case, for a pressure suppression type PCV, a steel PCV is more advantageous than a reinforced concrete PCV in points that thermal deterioration of concrete does not occur and the surface of the PCV can be externally cooled, for example. Thus, it is expected that the superiority of the steel PCV will be appreciated in the future.

The reactor building needs a biological shielding wall (which may be called BSW hereinafter) serving as a radiological countermeasure that is made of reinforced concrete and placed outside the steel PCV at a certain distance (1 m or less) so that the wall is not in contact with the PCV. In construction of the reactor building having the steel PCV, the PCV and the surrounding BSW need to be separately independently constructed. Besides, the PCV has outwardly protruding PCV penetration portions, such as pipes for external connection, and in addition, it is also needed to form openings, in the BSW, for the PCV penetration portions so as to pass through the BSW in such a manner that the openings are not in contact with the PCV penetration portions, but the gap between the openings and the PCV penetration portions is made minimal so as to ensure the radiation shielding effect.

Thus, when the steel PCV is used, in order to ensure the positional relationship between the PCV and the BSW, the PCV has to be constructed before the construction of the concrete frame of the BSW, and therefore, a downtime waiting for completion of the construction of the PCV may occur.

According to another recent method for reducing the construction period based on building modularization, the BSW is constructed as an SC building module by applying the SC structure to the BSW and integrating the BSW with the SC building. In this case, the SC building module is installed vertically from the upper side, which may cause a case that the SC building module inevitably interferes with the PCV penetration ports extending from the PCV.

In this regard, the reinforced concrete PCV and the steel plate concrete PCV are advantageous over the steel PCV. These PCVs combine the pressure resistant and confinement capabilities of the steel PCV and the shielding capability of the BSW and do not have the above-described defects or problems with the PCV penetration portion of the steel PCV because the PCV penetration portion and the BSW are previously integrated.

A structure of a reactor building of a nuclear power plant and a construction method thereof according to the prior art will be described hereunder with reference to the accompanying drawings.

FIG. 7 is a cross-sectional view of a reactor building under construction according to the prior art. This drawing illustrates modularization at the time of the reactor building being constructed.

FIG. 8 is a diagram for illustrating mounting of SC building modules of the reactor building.

In FIG. 7 a reactor building 2 is constructed of steel PCV blocks 60 and steel plate concrete (SC) building modules 80 and houses a steel pressure containment vessel (PCV) 1. PCV penetration portions 3 protrude to the outside of the PCV and penetrate a biological shielding wall (BSW) 4 made of reinforced concrete disposed outside the PCV. The steel PCV 1 is divided into steel PCV blocks 60 (A to F) by horizontal dividing planes 50, and the reactor building 2 is divided into SC building modules 80 ((i) to (iv)) by horizontal dividing planes 70. FIG. 8 shows interference of an SC building module 80 with the PCV penetration portion 3 of a steel PCV block 60.

As described above, in the construction of the reactor building and the steel PCV according to the conventional SC building modularization, the modules are mounted vertically from the upper side. Therefore, the SC building module inevitably interferes with the PCV penetration port protruding form the PCV. This poses an obstacle to reduction in the construction period, and a solution thereto has been required.

SUMMARY OF THE INVENTION

In view of the above circumstances encountered in the prior art mentioned above, an object of the present invention is to provide a nuclear rector building and a construction method thereof intended to prevent interference between a PCV penetration portion of a steel PCV and an SC building module and reduce the construction period.

The above object can be achieved according to the present invention by providing, in one aspect, a reactor building having a steel plate concrete structure that houses a pressure containment vessel formed with a plurality of pressure containment vessel penetration ports in the periphery thereof and includes a biological shielding wall disposed outside the pressure containment vessel, wherein the pressure containment vessel is vertically divided into a plurality of blocks, each of the blocks has one or more pressure containment vessel penetration ports arranged on a same horizontal plane, and the reactor building including the biological shielding wall is divided into a plurality of modules by the horizontal plane.

The above object can be also achieved according to the present invention by providing, in another aspect, a nuclear reactor building having a steel plate concrete structure that houses a pressure containment vessel formed of a plurality of pressure containment vessel penetration ports in the periphery thereof and includes a biological shielding wall disposed outside the pressure containment vessel, wherein the pressure containment vessel is vertically divided into a plurality of blocks, each of the blocks has one or more pressure containment vessel penetration ports arranged on a same horizontal plane, and the biological shielding wall is divided into a plurality of modules by the horizontal plane.

In the above aspects, the modules may be further divided by a vertical plane.

The above object can be also achieved according to the present invention by providing, in a further aspect, a construction method of a nuclear reactor building having a steel plate concrete structure that houses a pressure containment vessel formed with a plurality of pressure containment vessel penetration ports in the periphery thereof and includes a biological shielding wall disposed outside the pressure containment vessel, the construction method comprising the steps of: vertically dividing the pressure containment vessel into a plurality of blocks so that each block has one or more pressure containment vessel penetration ports arranged on a same horizontal plane; dividing the reactor building including the biological shielding wall into a plurality of modules by the horizontal plane; and alternately stacking the blocks of the pressure containment vessel and the modules of the reactor building.

6. The above object can be also achieved according to the present invention by providing, in a still further aspect, a construction method of a nuclear reactor building having a steel plate concrete structure that houses a pressure containment vessel formed with a plurality of pressure containment vessel penetration ports in the periphery thereof and includes a biological shielding wall disposed outside the pressure containment vessel, the construction method comprising the steps of: vertically dividing the pressure containment vessel into a plurality of blocks so that each block has one or more pressure containment vessel penetration ports arranged on a same horizontal plane; dividing the biological shielding wall into a plurality of modules by the horizontal plane; and alternately stacking the blocks of the pressure containment vessel and the modules of the biological shielding wall.

According to the present invention having the characteristics described above, when assembling workings of the steel PCV blocks and the SC building modules including the BSW are carried out at the same time, interference between the PCV penetration ports and the SC building modules can be prevented from occurring. Thus, the waiting for completion of the construction of the PCV can be reduced, and the construction period of the reactor building having the steel PCV can be reduced.

DESCRIPTION OF THE PREFERRED EMBODIMENTS

Structures of and construction methods of a reactor building of a nuclear power plant according to embodiments of the present invention will be described. In the following description, terms indicating directions, such as "upper", "lower", "left" and "right", are used herein with reference to the illustration on the accompanying drawings or in the actual installation state.

First Embodiment

In the following, a first embodiment of the present invention will be described with reference to FIGS. 1 to 4.

Figure 1:
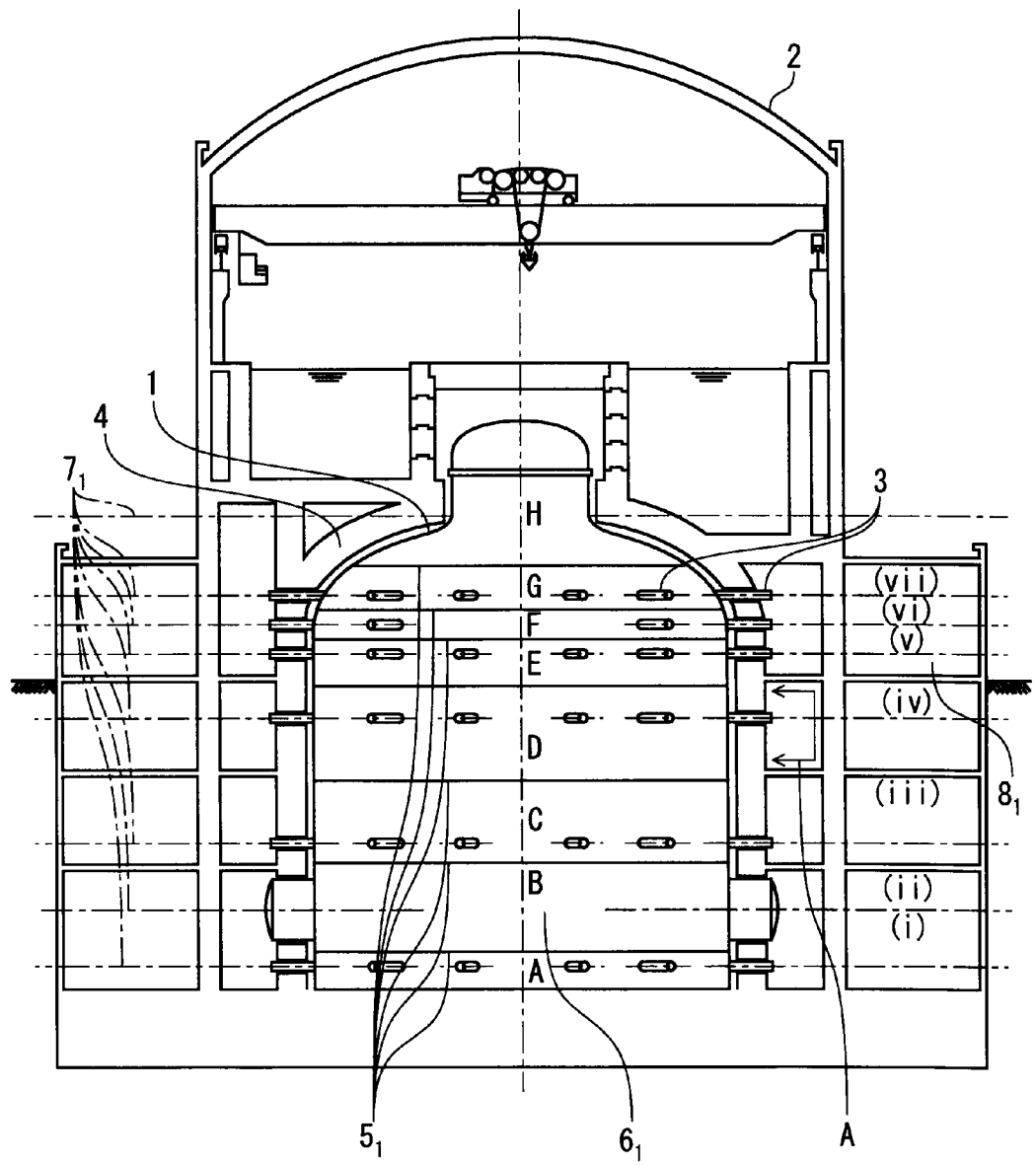
FIG. 1 is a cross-sectional view of a reactor building according to a first embodiment of the present invention.
Figure 7:
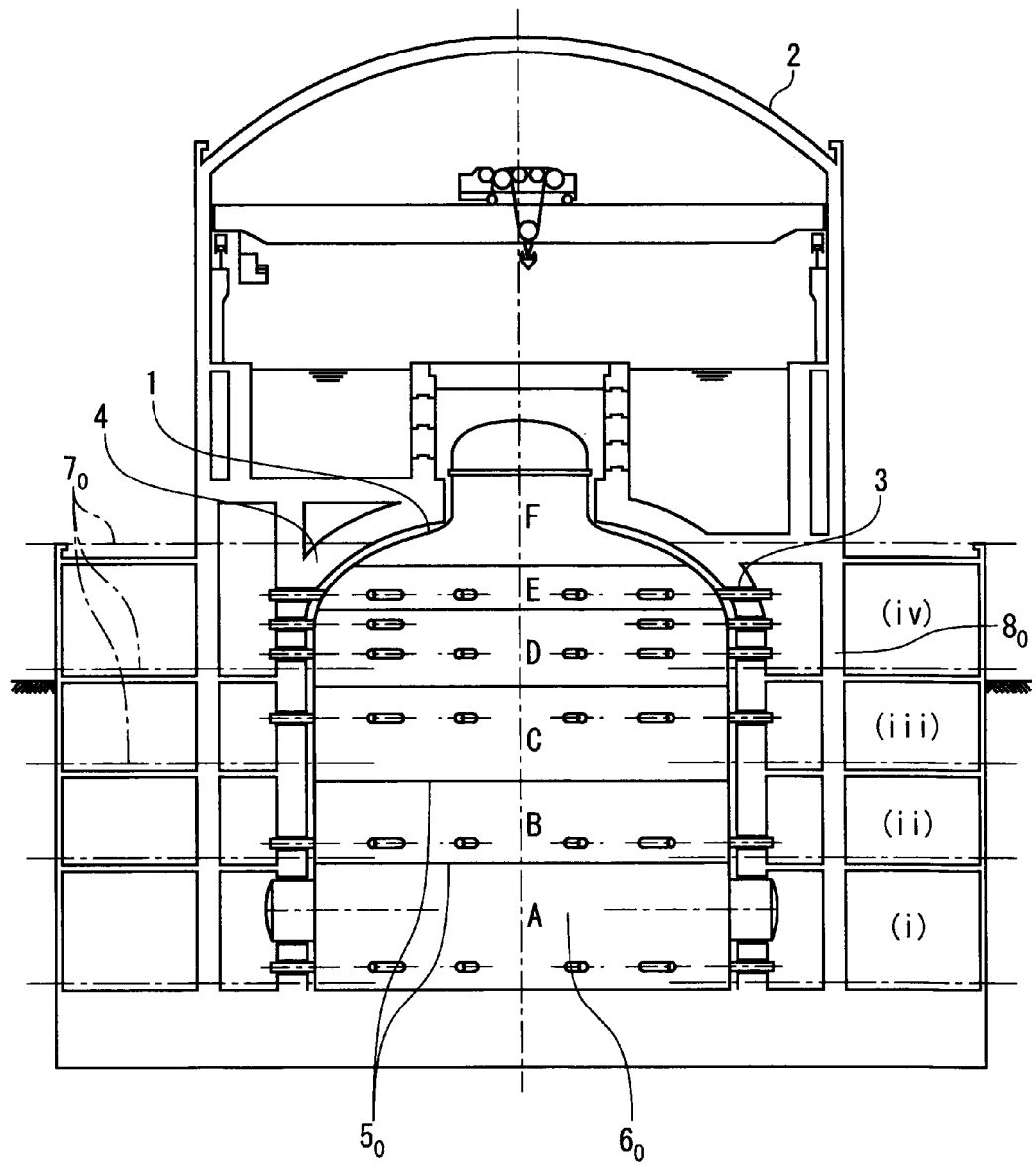
FIG. 7 is a cross-sectional view of a reactor building under construction according to the prior art.
Figure 8:
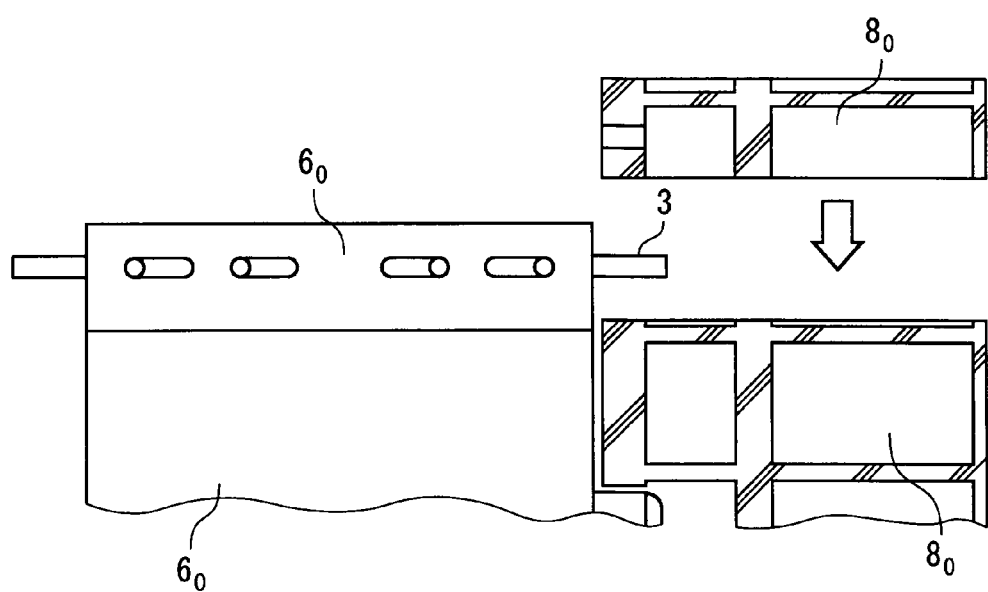
FIG. 8 is a diagram for illustrating mounting of SC building modules of the reactor building according to the prior art.

FIG. 1 is a cross-sectional view of a reactor building according to the first embodiment of the present invention. This drawing illustrates modularization of a nuclear reactor pressure containment vessel into mounting blocks and of an SC reactor building into SC building blocks during construction. The same parts as those in the prior art described in FIGS. 7 and 8 are denoted by the same reference numerals.

A reactor building 2 of the SC structure houses a steel PCV 1, which is formed with a plurality of penetration ports 3 penetrating a wall portion of the PCV (called PCV penetration ports herein) on the periphery of the PCV, and includes a BSW 4 disposed outside the PCV. The steel PCV 1 is vertically divided into a plurality of steel PCV block $6_1$ (A to H) by horizontal steel PCV dividing planes $5_1$, and each block has one or more PCV penetration ports 3 arranged on the same horizontal plane. The reactor building 2 is vertically divided into SC building modules $8_1$ ((i) to (vii)) by horizontal SC building dividing planes $7_1$ passing through the PCV penetration ports 3.

The BSW 4 disposed outside the PCV has the SC structure and is divided into modules by the same horizontal planes that pass through the PCV penetration ports 3 and divide the reactor building 2 into the SC building modules 8₁.

Figure 2:
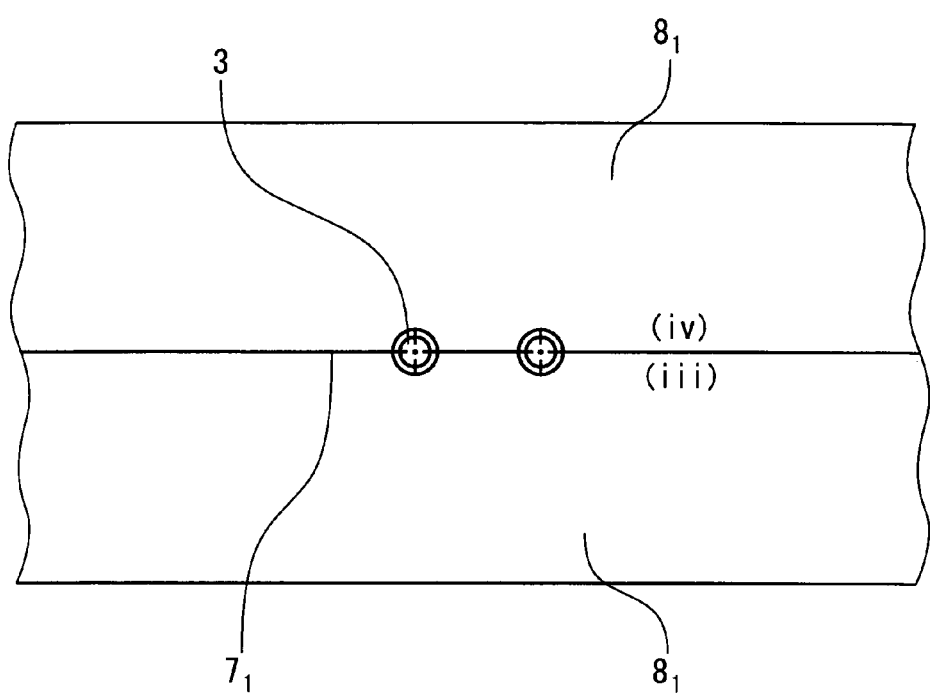
FIG. 2 is an illustration diagram showing PCV penetration portions of a steel PCV in the reactor building and building modules of the reactor building according to the first embodiment of the present invention as viewed from a direction of an arrow A in FIG. 1.

FIG. 2 is a diagram showing PCV penetration ports of the steel PCV in the reactor building and building modules of the reactor building viewed from the direction of an arrow A in FIG. 1.

The reactor building 2 is divided into modules by the horizontal planes passing through the PCV penetration ports 3. The steel PCV blocks 6₁ and the SC building modules 8₁ are alternately stacked. More specifically, the steel PCV blocks 6₁ and the SC building modules 8₁ are mounted in the order: A→(i)→B→(ii)→C→(iii)→D→(iv)→E→(v)→F→(vi)→G→(vii)→H. Thus, the steel PCV blocks 6₁ and the SC building modules 8₁ can be assembled without interference between the PCV penetration ports 3 and the SC building modules 8₁.

Figure 3:
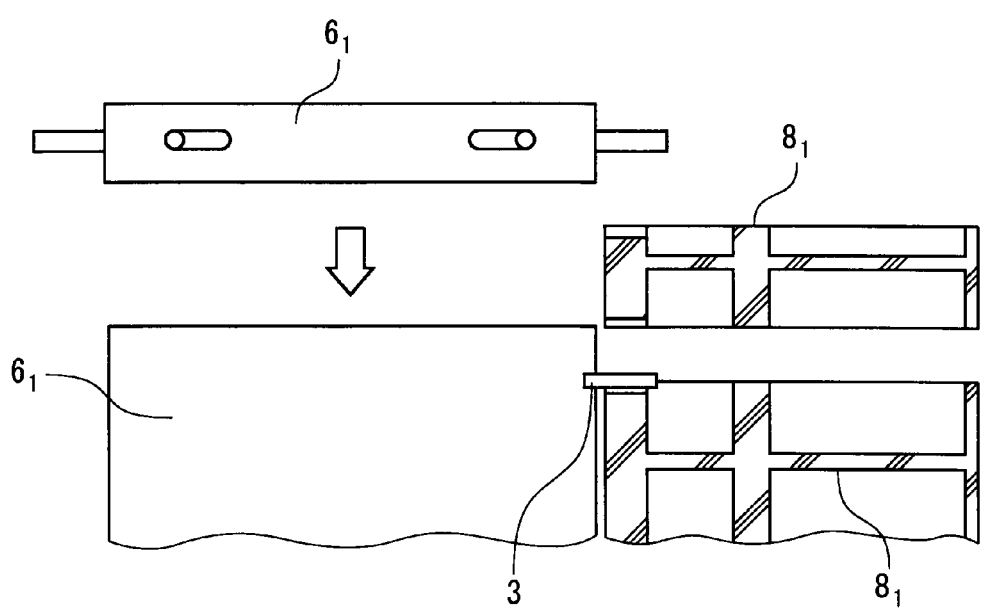
FIG. 3 is a diagram for illustrating mounting of the SC building modules of the reactor building according to the first embodiment of the present invention.

FIG. 3 is a diagram illustrating mounting of the SC building modules of the reactor building. As can be seen from this drawing, interference between the PCV penetration ports 3 and the SC building modules 8₁ is avoided.

Figure 4:
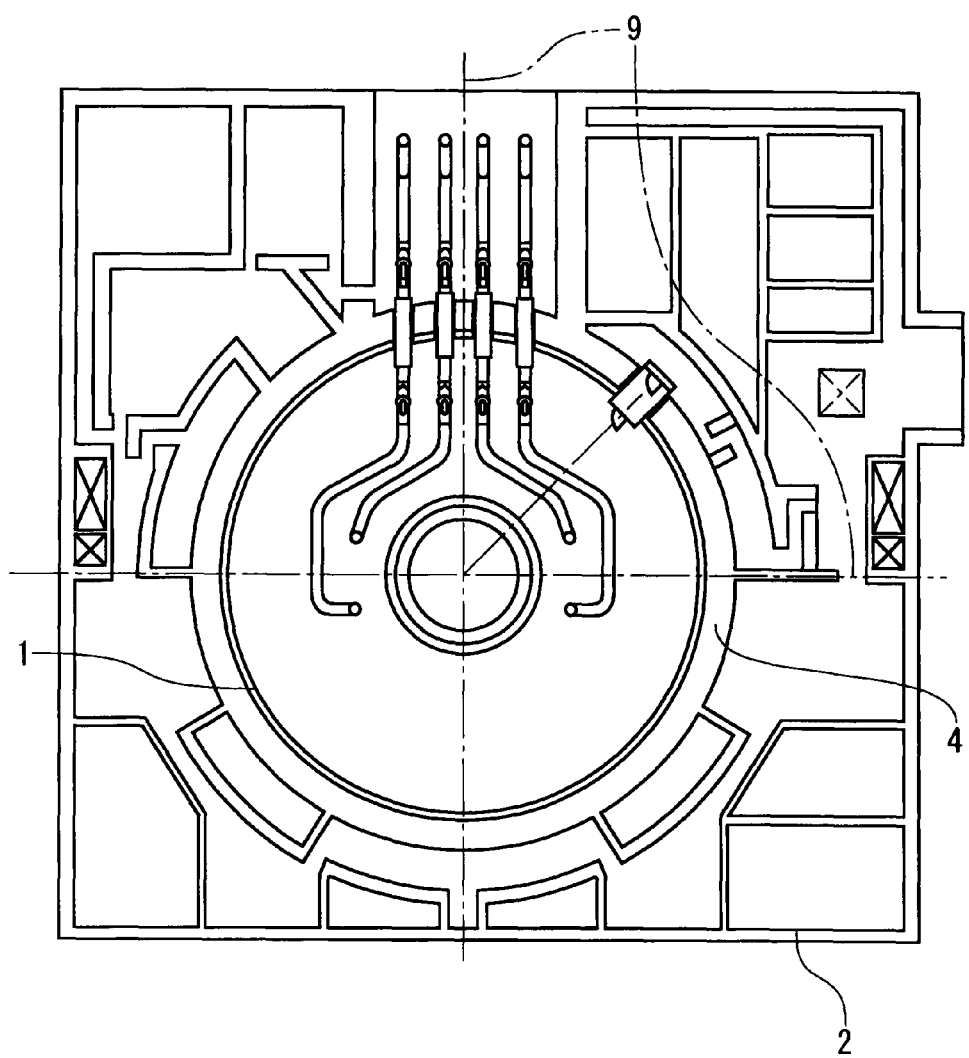
FIG. 4 is a plan view for illustrating horizontal division of the SC building module according to the first embodiment of the present invention.

FIG. 4 is a diagram illustrating horizontal division of the SC building module.

The SC building module 8₁ is horizontally divided into four parts by vertical SC building module dividing planes 9 that pass through the center of the steel PCV 1, for example. The number of the divisional parts can be arbitrarily selected depending on the capacity of the crane used on the construction site. Furthermore, different horizontally divided parts of the nuclear rector building may be vertically divided into different number of SC building modules.

The vertical position of the boundary between the SC building modules 8₁ passing through the PCV penetration ports 3 (the position of the horizontal SC building dividing plane 7₁) may not be the center of the penetration ports as far as it is ensured that interference between the PCV penetration ports 3 and the SC building modules 8₁ does not occur.

Second Embodiment

In the following, a second embodiment of the present invention will be described with reference to FIGS. 5 and 6.

Figure 5:
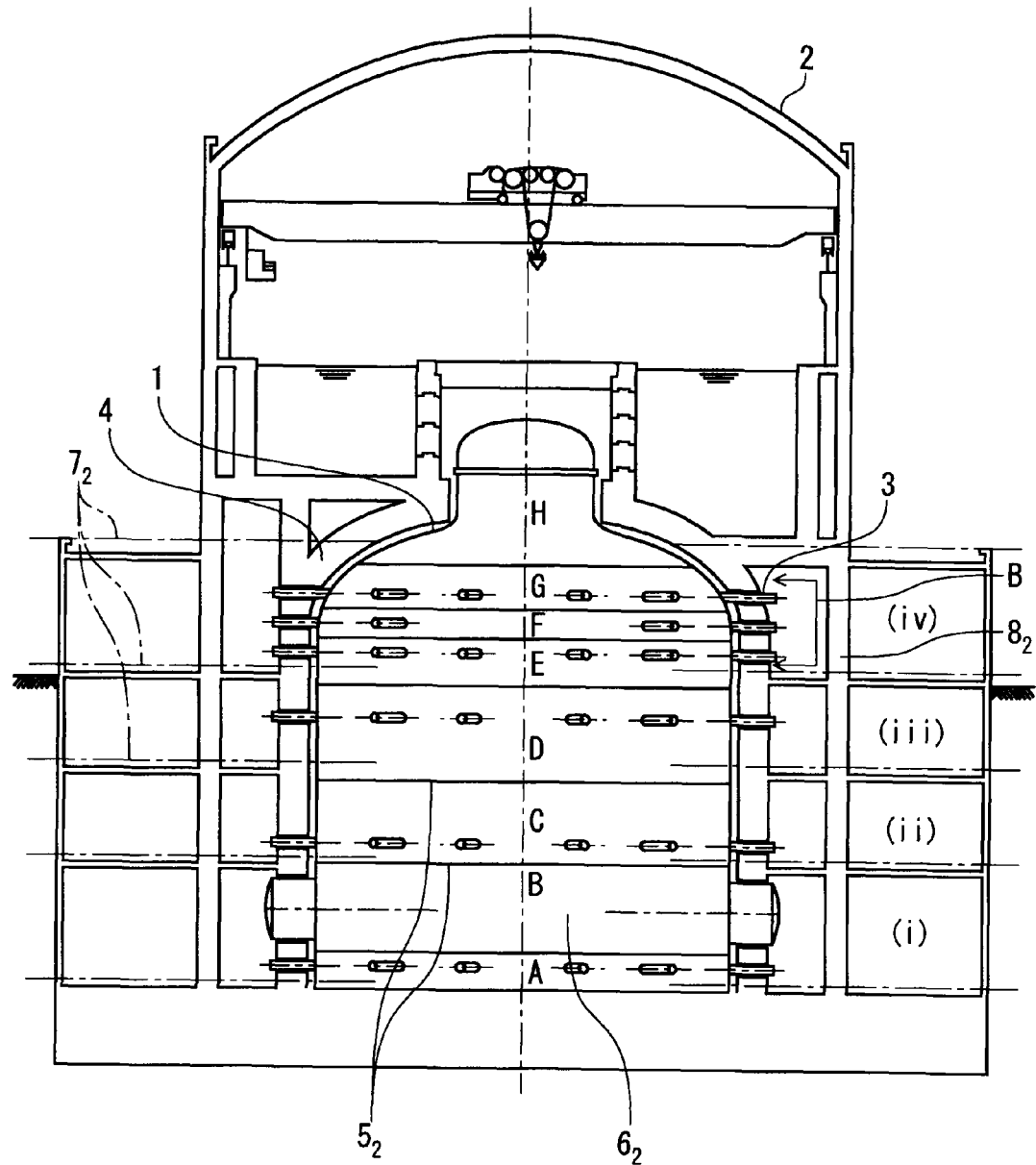
FIG. 5 is a cross-sectional view of a reactor building according to a second embodiment of the present invention.

FIG. 5 is a cross-sectional view of a reactor building according to the second embodiment of the present invention. This drawing illustrates modularization of a nuclear reactor pressure containment vessel into mounting blocks and of an SC reactor building into SC building blocks during construction. The same parts as those in the prior art shown in FIGS. 7 and 8 are denoted by the same reference numerals.

Figure 6:
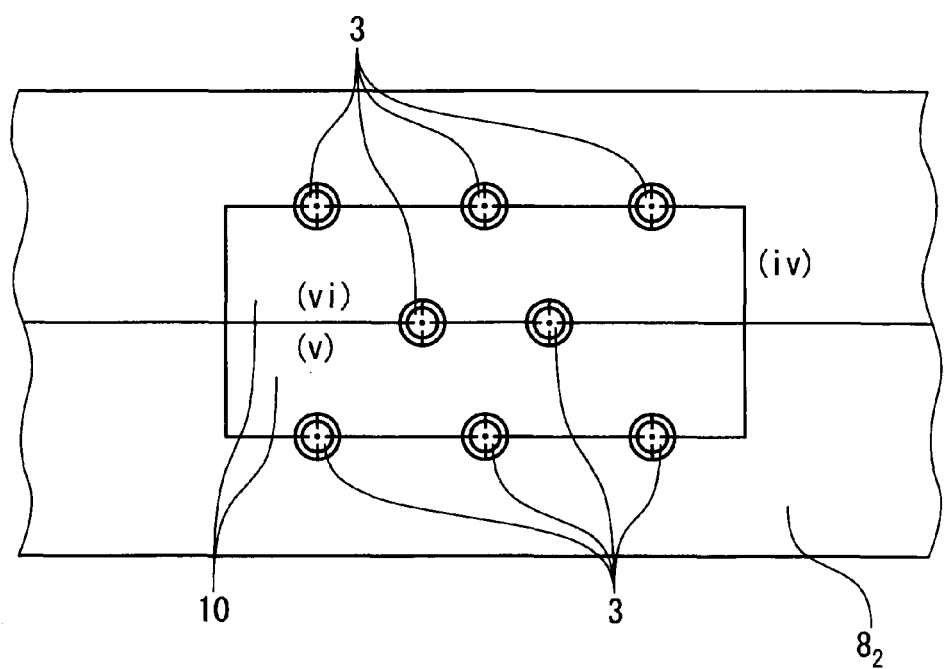
FIG. 6 is a diagram showing a part of a steel PCV in which PCV penetration portions are concentrated and building modules according to the second embodiment of the present invention viewed from a direction of an arrow B in FIG. 5.

FIG. 6 is a diagram showing a part of a steel PCV in which the PCV penetration ports are concentrated and the SC building modules of the reactor building viewed from the direction of the arrow B in FIG. 5.

As in the first embodiment, a reactor building 2 of the SC structure houses a steel PCV 1, which is formed with a plurality of the penetration ports 3 in the periphery the PCV, and includes a BSW 4 disposed outside the PCV. The steel PCV 1 is vertically divided into a plurality of steel PCV block 6₂ (A to H) by a plurality of horizontal steel PCV dividing planes 5₁, and each block has one or more PCV penetration ports 3 arranged on the same horizontal plane. The reactor building 2 is vertically divided into SC building modules 8₂ ((i) to (iv)) by horizontal SC building dividing planes 7₂ in the same manner as the prior art shown in FIG. 7.

Furthermore, with the SC building module 8₂, a part of the BSW 4 is cut off, and the SC building module 8₂ is divided into BSW modules 10 ((v) to (vi)) by horizontal planes passing through the PCV penetration ports 3.

In this embodiment, the BSW 4 in which PCV penetration ports 3 are concentrated is divided into the same number of parts as the number of different levels of the PCV penetration ports 3 by horizontal planes passing through the PCV penetration ports 3, thereby preventing interference between the PCV penetration ports 3 and the steel PCV 1. Thus, the number of SC building modules can be reduced. The steel PCV blocks 6₂ and the BSW modules 10 are alternately stacked.

More specifically, in the portion in which the PCV penetration ports 3 are concentrated, the steel PCV blocks 6₂ and the SC building modules 8₂ including the BSW modules 10 are mounted in the order: D→(iii)→E→(v)→F→(vi)→G→(iv)→H. As a result, the number of mountings of the SC building modules 8₂, which are heavy and take much time to be mounted in precise alignment, can be reduced, thus reducing the construction period.

It is to be noted that the present invention is not limited to the embodiments described above, and many other changes and modifications may be made without departing form the scope of the appended claims.

For example, although a portion of the BSW 4 in which PCV penetration ports 3 are concentrated is divided, the whole of the BSW 4 may be divided.

Furthermore, the vertical position of the boundary between the BSW modules 10 passing through the PCV penetration ports 3 (the position of the horizontal plane) may not be the center of the penetration ports as far as it is ensured that the PCV penetration ports 3 and the BSW modules 10 have dimensions which do not cause any interference therebetween.

Furthermore, as in the first embodiment, the BSW module 10 may be further divided into divisional modules by vertical planes as shown in FIG. 4.

What is claimed is:

1. A nuclear reactor building comprising:
   a pressure containment vessel formed with a plurality of pressure containment vessel penetration ports in the periphery thereof, wherein the pressure containment vessel is vertically divided into a plurality of blocks, each of the blocks has one or more pressure containment vessel penetration ports, wherein for each one of the blocks, all of the one or more containment vessel penetration ports of the respective one of the blocks are arranged on a same horizontal plane; and
   a biological shielding wall disposed outside the pressure containment vessel, wherein the biological shielding wall is divided into a plurality of modules by plural horizontal planes, and at least a portion of the biological shielding wall comprises a steel plate reinforced concrete.

2. The nuclear reactor building according to claim 1, wherein the modules are further divided by a vertical plane.

3. The nuclear reactor building according to claim 1, wherein at least one of the modules of the biological shielding wall is integrated with a building module of the nuclear reactor building.

* * * * *